United States Patent
Leppard et al.

(10) Patent No.: US 7,256,881 B2
(45) Date of Patent: Aug. 14, 2007

(54) SYSTEMS AND METHODS FOR INSPECTION OF OPHTHALMIC LENSES

(75) Inventors: Kirk Leppard, Southampton (GB); Mark Hoyle, Holbury Southhampton (GB); Chris Townsend, Mitcheldean (GB); Mike Hazel, Cambridge (GB)

(73) Assignee: CoopervVision, Inc., Fairport, NY (US)

( * ) Notice: Subject to any disclaimer, the term of this patent is extended or adjusted under 35 U.S.C. 154(b) by 477 days.

(21) Appl. No.: 10/361,204

(22) Filed: Feb. 7, 2003

(65) Prior Publication Data

US 2004/0008877 A1 Jan. 15, 2004

Related U.S. Application Data

(60) Provisional application No. 60/357,610, filed on Feb. 15, 2002.

(51) Int. Cl.
G01B 9/00 (2006.01)

(52) U.S. Cl. .................................................. 356/124

(58) Field of Classification Search ........ 356/124–127, 356/239.1–239.8; 382/141
See application file for complete search history.

(56) References Cited

U.S. PATENT DOCUMENTS

| | | | |
|---|---|---|---|
| 3,988,068 A | 10/1976 | Sprague | |
| 5,100,232 A | 3/1992 | Smith et al. | |
| 5,500,732 A | 3/1996 | Ebel et al. | |
| 5,528,357 A | 6/1996 | Davis | |
| 5,574,554 A * | 11/1996 | Su et al. ..................... | 356/124 |
| 5,578,331 A | 11/1996 | Martin et al. | |
| 5,604,583 A | 2/1997 | Byron et al. | |
| 5,627,638 A | 5/1997 | Vokhmin | |
| 5,633,504 A | 5/1997 | Collins et al. | |
| 5,717,781 A | 2/1998 | Ebel et al. | |
| 5,748,300 A | 5/1998 | Wilder et al. | |
| 5,801,822 A * | 9/1998 | Lafferty et al. ............. | 356/124 |
| 5,812,254 A * | 9/1998 | Ebel et al. .................. | 356/124 |
| 5,818,573 A * | 10/1998 | Lafferty et al. ............. | 356/127 |
| 5,828,446 A | 10/1998 | Davis | |
| 6,047,082 A | 4/2000 | Rhody et al. | |
| 6,088,089 A | 7/2000 | Reis | |
| 6,154,274 A | 11/2000 | Davis et al. | |
| 6,314,199 B1 | 11/2001 | Höfer et al. | |

FOREIGN PATENT DOCUMENTS

| | | |
|---|---|---|
| EP | 0604179 | 6/1994 |
| WO | 9926052 | 5/1999 |
| WO | 0046582 | 8/2000 |

* cited by examiner

*Primary Examiner*—Hoa Q. Pham
(74) *Attorney, Agent, or Firm*—Stout, Uxa, Buyan & Mullins, LLP; Frank J. Uxa; Greg S. Hollrigel

(57) ABSTRACT

An automated lens inspection system that images the edge and surface of an ophthalmic lens transmits light through the ophthalmic lens to a camera to create a complete digital image of the lens edge or lens surface. The digitized image (s) is(are) analyzed to detect defects or abnormalities of the ophthalmic lens. Methods of inspecting ophthalmic lenses are also disclosed.

29 Claims, 6 Drawing Sheets

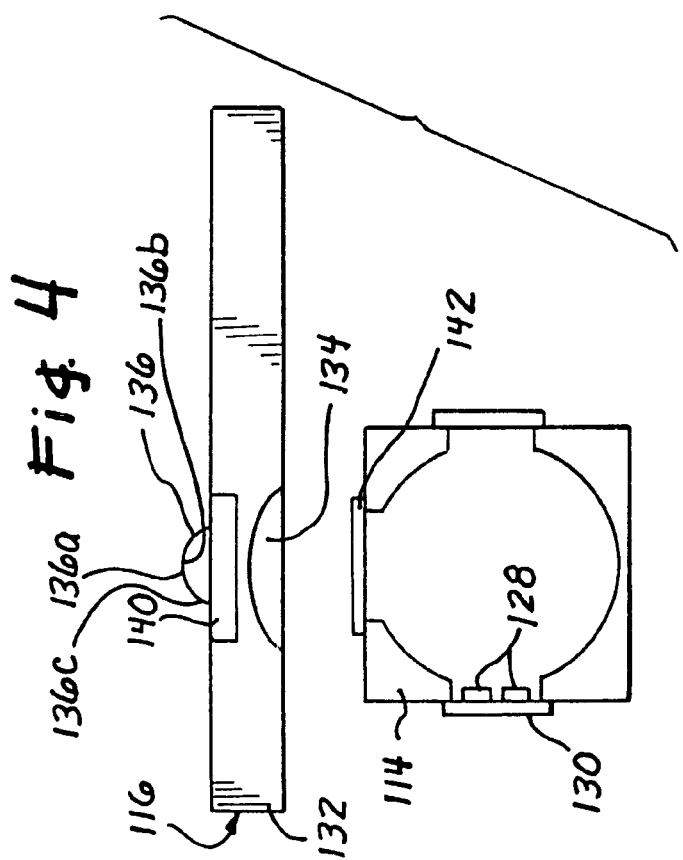
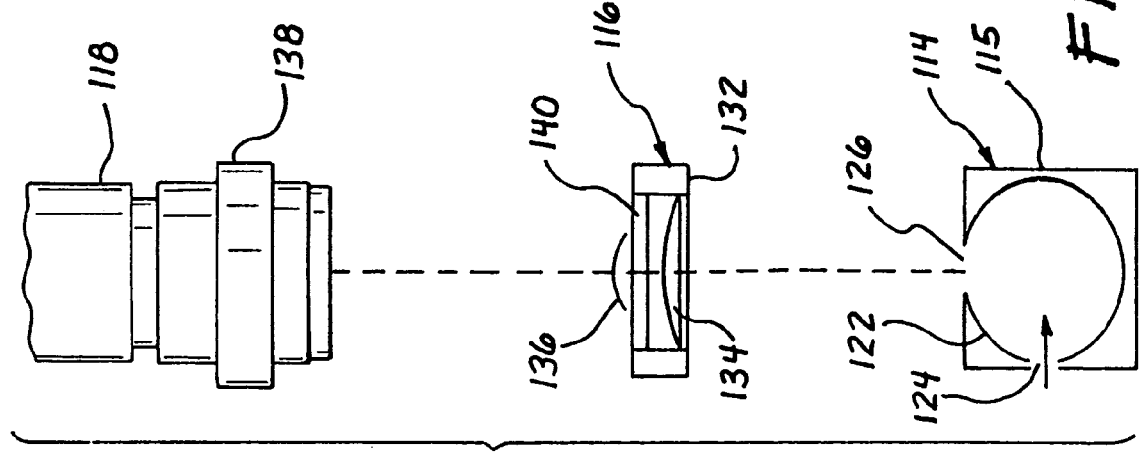

SYSTEMS AND METHODS FOR INSPECTION OF OPHTHALMIC LENSES

CROSS-REFERENCE TO RELATED APPLICATIONS

This application claims the benefit of U.S. Provisional Application Ser. No. 60/357,610, filed Feb. 15, 2002, the content of which in its entirety is hereby incorporated by reference.

BACKGROUND OF THE INVENTION

1. Field of the Invention

The present invention relates to lens inspection systems, and more particularly, the invention relates to automated systems and methods for inspecting ophthalmic lenses by acquiring and analyzing a plurality of images of the lenses being inspected.

2. Description of Related Art

Precision and accuracy in manufacturing ophthalmic lenses, such as contact lenses, are crucial for the use of such lenses in patients. Due to the increased demand for contact lenses, the manufacturing process of contact lenses has been automated to reduce manufacturing time and increase product turnover. However, the contact lenses are susceptible to damage, abnormalities, or contamination that would make the lenses unsuitable for use in patients. Accordingly, it is desirable to provide an inspection process of the manufactured lenses to reduce, and preferably eliminate, production of defect lenses.

Examples of contact lens inspection systems are disclosed in U.S. Pat. Nos. 5,500,732; 5,574,554; 5,748,300; 5,818,573; and 5,828,446.

U.S. Pat. No. 5,574,554 discloses an automated contact lens inspection system that inspects a contact lens while the lens is still in place on a transparent lens mold. The system uses a white light source that emits collimated white light through the transparent lens mold and through the lens being inspected to a camera. The camera utilizes a lens having a viewing angle that is constant within 0.5° for a ⅔ inch CCD array camera and 0.4° for a ½ inch camera, which is important in that system for the optical detection of the edge of the contact lens. The camera acquires a single image of the contact lens and converts the image into a digital representation of the lens for further processing by a computer to detect abnormalities of the lens.

U.S. Pat. No. 5,818,573 discloses an ophthalmic lens inspection system that uses diffuse white light to illuminate an inspected lens. The lens inspection system utilizes a plurality of cameras to acquire images of the inspected lens, and each camera is provided with a light source. The cameras that image the lens edge only image a portion of the lens edge. Accordingly, in order to obtain a complete image of the ophthalmic lens edge, eight cameras perimetrically disposed around the ophthalmic lens are used. Each camera is positioned at an acute angle with respect to the plane of the lens support. Each image acquired by each of the eight cameras is separately processed to minimize computational processing power. The system of the '573 patent does not inspect lenses for defects, instead, the system of the '573 patent inspects lenses to determine whether the lens is properly centered on the inspection system.

U.S. Pat. No. 5,500,732 discloses an ophthalmic lens inspection system that utilizes non-infrared light to image a hydrated lens. The light must pass through a ground glass diffuser, an air spaced doublet collector lens, and a field lens. The numerous components required in the inspection system necessarily require precise alignment and spacing of the various optical components in order to achieve the intended results. The image processor acquires a single image from the camera and analyzes either the center of the ophthalmic lens or the edge of the ophthalmic lens.

U.S. Pat. Nos. 5,748,300 and 5,828,446 disclose an automated lens inspection system that inspects hydrated lenses using dark field illumination. The lenses are imaged in a single step thereby contributing to the continuous lens inspection cycle disclosed therein. Each dark field image of a lens may reveal the lens edge as well as any defects or abnormalities in the lens that are sufficient to cause a scattering of light so that the light is imaged by the camera.

The lens inspection systems disclosed hereinabove that acquire only a single image of the ophthalmic lenses are susceptible to high false rejection rates, which may be caused by debris within the system or on the lens, or which may be caused by "noise", such as optical noise, within the system. For example, these systems are not readily able to determine whether a potential defect near the lens edge is actually a defect of the lens, or whether it is debris on the window on which the lens is positioned. Accordingly, these systems may have high false rejection rates (e.g., rejection of lenses that were placed on a contaminated window), or may accept lenses that have small, but significant, defects near the lens edge.

SUMMARY OF THE INVENTION

An automatic ophthalmic lens inspection system in accordance with the present invention comprises a lens imaging subsystem, which acquires a plurality of images of each lens being inspected, and a lens image analysis subsystem, which analyzes each image of the lens to determine whether the lens being inspected has one or more defects or abnormalities. The automatic lens inspection system acquires one or more images of a lens edge and one or more images of the lens surface. In certain embodiments of the invention, the lens inspection system inspects lenses for defects on the anterior surface of the lens, the posterior surface of the lens, or a combination of both the anterior and posterior surfaces. In addition, the lens inspection system is configured to inspect lenses for defects in the center of the lens (e.g., in the optic zone of the lens), or in a portion of the lens located between the optic zone and the edge of the lens.

In a preferred embodiment, the images acquired by the inspection system are of lenses in their non-hydrated or "dry" state. A lens is typically imaged while the lens is placed on a transparent, or transparent to near infrared (NIR) electromagnetic energy, support surface. As used herein, NIR electromagnetic energy is defined as light having a wavelength range between about 780 nm to about 2,500 nm. In the illustrated embodiment, the lens inspection system utilizes two cameras for each lens being inspected. In additional embodiments, one camera may be used to acquire two or more images of the lens, as described herein. In even further embodiments, more than two cameras may be used to inspect the lenses. The inspection system is structured to provide nearly simultaneous inspection of a plurality of lenses. The cameras of the illustrated inspection system have a fixed focus objective lens that receives NIR light from a light source of the inspection system.

The edge and surface images of the ophthalmic lenses may be inspected separately and/or in combination. In the illustrated embodiment disclosed herein, the images are inspected by executing one or more computer programs that analyze changes in pixel intensity or contrast of the digitized images of the lenses. The combined results from the analysis of the lens images attempt to provide more accurate detection of lens defects, and attempt to reduce false rejections of the inspected lenses. For example, by combining results from each image of the lens, "noise", which may seem to be a lens defect in an otherwise acceptable lens, is reduced or eliminated so that the lens is not rejected. In addition, by acquiring a plurality of images of the lens with a camera having a relatively narrow depth of field, each of the images is a high resolution image of the lens edge or lens surface, and thus, fine defects in the lens, including the lens edge and/or the center of the lens, may be detected, as well as, contamination on the inspection window near the lens edge. The software provided with the inspection system may also categorize the defects detected in or on the lens based on predefined criteria of such defects. For example, defects may be categorized based on the size, shape, or intensity of the image corresponding to the defect. The software provided with the inspection system may also be able to accurately track the lens edge with high resolution to be able to discriminate between debris that may be on the inspection window in proximity to the lens edge but not actually contacting the lens edge, and actual defects on or in the lens edge. In other words, the software of the system may permit debris that is in the light path of the inspection system and that is near the lens edge, but is not abutting the lens edge, to be detected. In additional embodiments, the system may also be able to detect differences in lens edge defects and debris that is contacting the edge of the lens.

In one embodiment of the invention, an ophthalmic lens inspection system comprises an ophthalmic lens imaging subsystem, which comprises a light source, and a digital camera; an ophthalmic lens support that permits light from the light source to pass therethrough; and an image analysis subsystem, which comprises one or more computers, that analyzes the digitized images of the lens. The lens images include one or more separate edge images and one or more separate surface images, such as surface images of the center of the lens. The edge images of the ophthalmic lens may be obtained by one camera, and the surface images of the ophthalmic lens may be obtained by another camera. The cameras of the inspection system may be oriented perpendicularly to a plane parallel to the ophthalmic lens support structure.

In one embodiment, a method of inspecting ophthalmic lenses includes the steps of obtaining a complete image of the edge of the ophthalmic lens, and obtaining an image of a surface of the ophthalmic lens that is spaced from the edge of the lens, and transferring those images to a computer for analysis. In certain embodiments, the ophthalmic lens is a contact lens in a non-hydrated state. The images are analyzed by one or more computers to detect defects or other undesirable features of the lenses. For example, the images may be analyzed by performing one or more edge tracking algorithms on the edge images. One lens tracking algorithm tracks both the inner edge and the outer edge of the imaged ophthalmic lens edge. Abnormalities detected by the software may also be categorized into one or more categories of defects depending on the features of the abnormalities, such as the length, diameter, or intensity of the abnormalities, among other things.

A method of inspecting ophthalmic lenses may also include the steps of: (a) positioning an ophthalmic lens on a support window; (b) separately imaging the lens edge and the lens surface by passing light emitted from a light source through the support window and the ophthalmic lens, and capturing the lens image with a camera; (c) digitizing the lens images captured in step (b), and communicating the digitized lens images to one or more computers; and (d) analyzing the digitized lens image with one or more algorithms to determine if the ophthalmic lens has a defect. The method may also include a step of combining the lens images to reduce optical noise. The lens may be positioned on a support window that is a part of a rotating table that rotates so that the lenses are disposed between the light source and cameras. The camera used in accordance with the foregoing method may be a digital camera.

Any feature or combination of features described herein are included within the scope of the present invention provided that the features included in any such combination are not mutually inconsistent as will be apparent from the context, this specification, and the knowledge of one of ordinary skill in the art.

Additional advantages and aspects of the present invention are apparent in the following detailed description.

BRIEF DESCRIPTION OF THE FIGURES

FIG. 3 is a side elevation view of a light source, an illumination transfer system, and a camera of the inspection head of FIG. 2.

FIG. 4 is a magnified side elevation view of the light source and illumination transfer system shown in FIG. 3.

DETAILED DESCRIPTION

Figure 1:
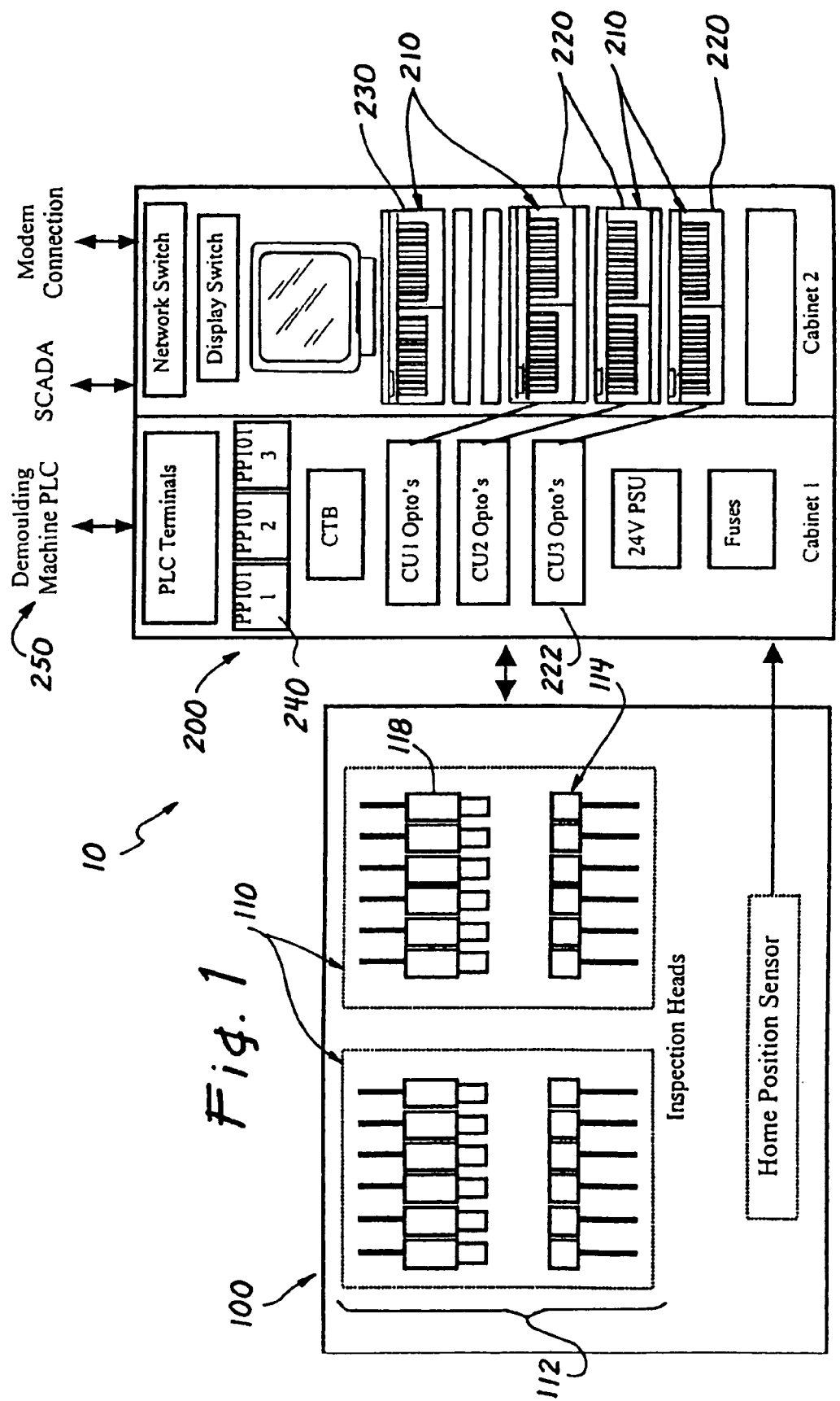
FIG. 1 depicts an ophthalmic lens inspection system, which comprises an illumination subsystem and an image analysis subsystem.

FIG. 1 illustrates a lens inspection system 10, which is used to automatically inspect lenses, such as contact lenses, or other ophthalmic lenses. Lens inspection system 10 is structured to inspect lenses in their dry, or non-hydrated, state. In the illustrated embodiment of the invention, lens inspection system 10 inspects each lens after the lens has been removed from a lens mold. The inspection system 10 inspects the lens by imaging the edge of the lens and imaging the surface of the lens, and processing the edge and surface images using one or more computer algorithms to detect lens defects or abnormalities.

Lens inspection system 10 generally comprises an image acquisition subsystem 100, and an image analysis subsystem 200. In reference to the disclosure herein, the image acquisition subsystem 100 may be an ophthalmic lens demolding machine, and the image analysis subsystem 200 may be referred to as an inspection platform.

1. Image Acquisition Subsystem 100.

Figure 2:
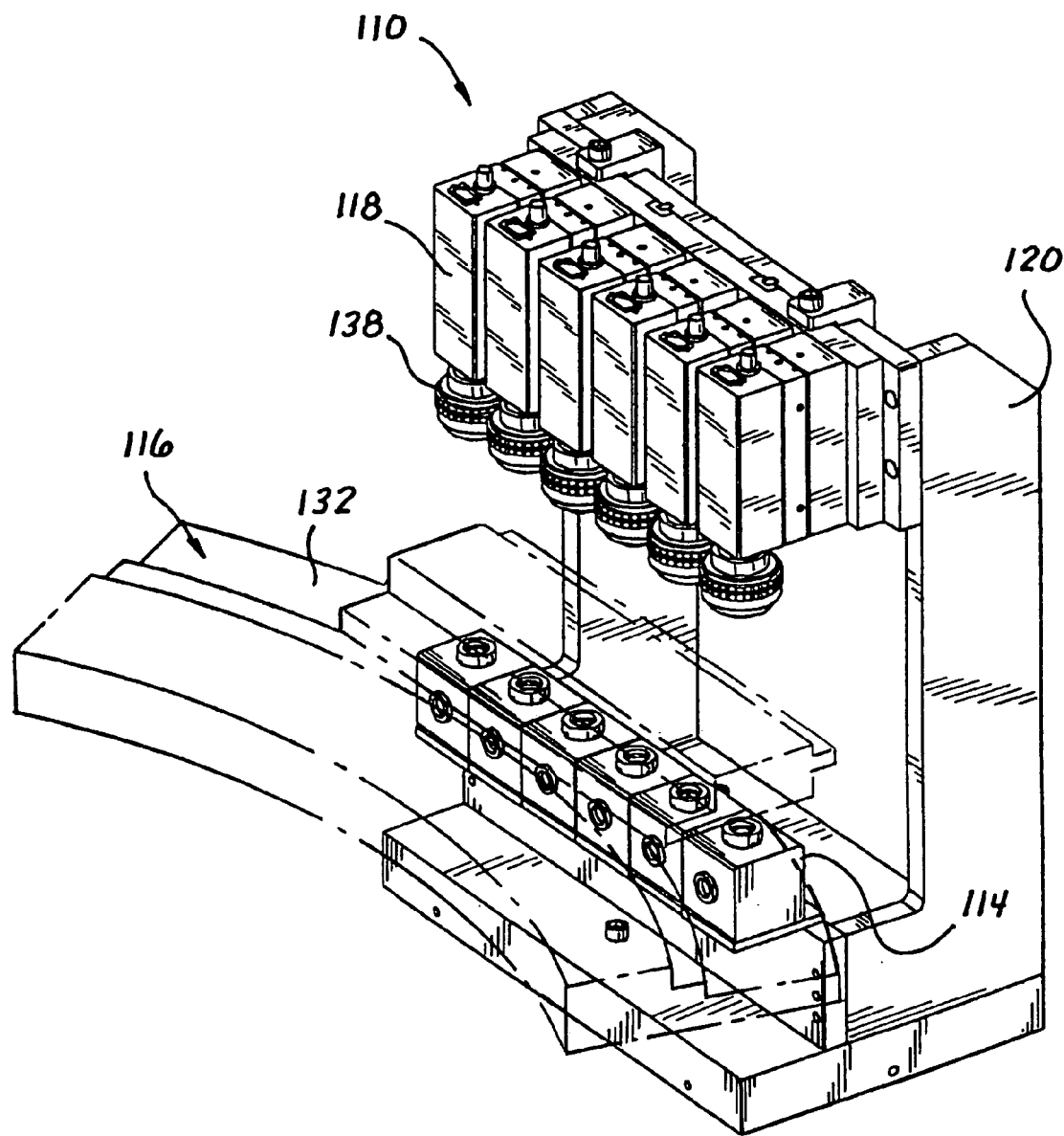
FIG. 2 is a perspective view of an inspection head of the illumination subsystem of FIG. 1.

Image acquisition subsystem 100 comprises one or more inspection heads 110. In the illustrated embodiment of the invention, image acquisition subsystem 100 comprises two inspection heads 110. Inspection heads 110 each have one or more illumination/image acquisition systems 112, which generally comprise a light source 114, a support 116 for a contact lens (see FIG. 2), and a camera 118. As illustrated in FIGS. 1 and 2, each inspection head 110 comprises six illumination/image acquisition systems 112. Each illumination/image acquisition system 112 is structured so that each camera 118 is in optical alignment with its respective light source 114. In other words, light emitted from light source 114 projects to a lens of camera 118. Contact lens support 116 is structured to hold one or more lenses to be inspected by inspection heads 110. In the illustrated embodiment, demolding table 116 is a curved table that rotates so that each of the lenses to be inspected passes between a camera 118 and a light source 114 to permit the camera to obtain an image of the lens to be inspected. Because the illustrated embodiment of the demolding machine 100 includes two sets of six illumination/image acquisition systems 112, the automated inspection system 10 may image twelve different lenses at one time. The automated lens inspection system 10 can inspect 180 lenses per minute (e.g., 6 lenses per every 2 seconds).

1A. Illumination Source 114.

As illustrated in FIG. 3 and FIG. 4, illumination source 114 comprises a frame or housing 115 having a spherical cavity 122 fitted with one or more NIR light emitting diodes (LEDs) 128 (see FIG. 4) to provide a homogenous, or nearly homogenous, NIR illumination source. The illumination source 114 provides illumination with spatial uniformity to reduce illumination artifacts in the lens image; provides NIR spectrum illumination for ambient rejection using NIR pass (and visible block) filters; provides high peak radiance to provide sufficient exposure of the lens being inspected in a short duration; and has an external intensity control to allow exposure control independent of lens aperture of the imaging camera 118.

The LEDs 128 may be provided on an LED board 130 (FIG. 4), which may be a small printed circuit board (PCB), with four IR LED's (e.g., Siemens SFH421). The LEDs are used to illuminate the lens being inspected. The LEDs are operably connected to a light controller 240 (see FIG. 5) so that the LEDs receive a signal, such as a current pulse, from the light controller (described herein) so that the LEDs may emit light. For example, the LEDs may emit NIR light at a peak wavelength of approximately 880 nm. In the illustrated embodiment of the invention, there is one illumination PCB per illumination source 114. However, more than one illumination PCB may be provided in each illumination source depending on the inspection system. The LED PCB is publicly available from Cambridge Consultants, Ltd. (Cambridge, U.K.).

Illumination sources 114 may also be provided with a reflective coating so that light emitted from LEDs 128 is effectively emitted through an opening, such as port 126, of illumination source 114. The reflective coating may be provided in a spherical shape. The sphere may be a hollow thin-walled metal sphere with high reflectivity. This is in contrast to conventional hollow, thick-walled polymer spheres used in other systems.

In the illustrated embodiment of the invention, illumination source 114 is a cube-shaped structure having a spherical cavity 122. Spherical cavity 122 is provided with the reflective coating. In the illustrated embodiment, the coating is a Sprectaflect™ coating. Illumination source 114 may be referred to as an integrating sphere. Integrating sphere 114 is similar, at least in part, to the publicly available Labsphere IS-020-SF (Labsphere, Inc., North Sutton, N.H., U.S.). Integrating sphere 114 in accordance with the description herein has been modified from the Labsphere IS-020-SF so that the width of the sphere cavity 122 is reduced to 54.5 mm to permit use at 55 mm pitch of lenses on the demolder machine; so that the integrating sphere has one 15 mm port and two 0.5" ports instead of four 0.5" ports; and so that the internal baffle has been omitted. One 0.5" port 124 is used for the NIR LED light source 130. The 15 mm port 126 may be the output port providing a source of homogenous NIR illumination. The size of this aperture contributes to the angular characteristics of the illumination. In the illustrated embodiment, the 15 mm port provides relatively omni-directional illumination in order to yield images of lenses (without defects) with relatively uniform contrast. Although specific dimensions are disclosed in referring to the illustrated embodiment of the invention, the dimensions can be adjusted to suit the particular needs of the inspection system. For example, the use of smaller apertures (e.g., less than 15 mm) may provide more directional lighting and may increase the contrast, for example, of the lens periphery.

A protective window 142 may be provided over the integrating sphere 114 to further reduce the likelihood of damage or contamination to the reflective coating. The protective window 142 may be made of any suitable material that permits light, such as NIR light, to be transmitted therethrough. For example, protective window 142 may be a BK7 glass window. The protective window shown in the illustrated embodiment of the invention may have a 16 mm diameter and a 3 mm thickness. One suitable example is sold by Comar (Buena, N.J., U.S.; part number 16GQ00). The top surface of the protective window 142 should be kept clear of any substantial lens debris so that proper illumination is not impaired. To further reduce the likelihood of accumulating debris on the protective lens, a manifold (not shown) may be provided with the inspection system. The manifold permits a small jet of air to be directed onto each window to remove any potentially accumulated debris. A blast of air may be applied to the manifold under control of the demolder programmable logic controller 250 at suitable intervals according to the observed rate of debris accumulation.

1B. Illumination Transfer System 116.

Illumination transfer system 116 comprises a table 132 for supporting one or more ophthalmic lenses to be inspected. Illumination transfer system 116 provides efficient transfer of light from the integrating sphere 114 through output port 126 through the lens 136 being inspected to an objective 138 of camera 118. Illumination transfer system 116 may also comprise an illumination lens 134 and a window 140. The illumination lens 134 and window 140 may be provided in an illumination insert (not shown) that is structured to retain lens 134 and window 140, and to fit within table 132. Table 132 has a planar surface for supporting lens 136. As illustrated, lens 136 includes an anterior convex surface 136a, and a posterior concave surface 136b. A lens edge 136c is located at the junction of anterior surface 136a and posterior surface 136b. As shown more clearly in FIG. 7, lens edge 136c includes an outer edge 136d and an inner edge 136e the distance between the outer and inner edges defining a thickness of the lens. Table 132 is configured to support lens 136 in its dry state (e.g., lens 136 is not contained in a volume of liquid, such as saline or water). As illustrated, lens 136 is placed on table 132 so that lens edge 136c is lying against the planar surface of table 132, and thus, the anterior convex surface 136a is located a closer distance to the objective lens 138 of camera 118 than is the posterior concave surface 136b.

Table 132 is disposed between cameras 118 and integrating spheres 114, and rotates so that the lenses being inspected may be aligned between the integrating spheres and the cameras. Lenses 136 are disposed edge down (i.e., with the lens' convex surface facing the camera objective 138) on window 140 as shown in FIGS. 3 and 4, and as described above. Accordingly, window 140 should be fabricated from a material that permits light, such as NIR light, to be transmitted through the window to lens 136. The illumination transfer window 140 is provided to create a relatively flat or planar surface that permits unhindered imaging and illumination of ophthalmic lens 136. One example of a suitable window is a window that has a clear aperture of at least 19 mm, an external transmission of greater than 80% in NIR (greater than or equal to 780 nm); sufficient strength for use in the demolder without fracturing; free from defects that would contribute to false rejections of the lenses; and sufficient scratch resistance such that defects that may result in false rejection of lenses do not develop over time. Suitable windows may include one or more of the foregoing attributes. One suitable window is a 3 mm thick sapphire window, but glass windows are also acceptable. In addition, the glass windows could be provided with hard coatings, such as diamond like coatings (DLC).

An example of an illumination lens 134 used in the illustrated embodiment of the invention is a plano convex lens of 40 mm focal length and 25 mm diameter. The lens is publicly available from COMAR (Buena, N.J., U.S.) part number 40PQ25. The lens is typically oriented so that the convex side of the lens is facing the lens being inspected.

1C. Camera 118.

The camera of the imaging and acquisition subsystem 100 should be capable of digitizing images of the lens 136 so that the images can be analyzed by a computer. In the illustrated embodiment of the invention, each camera 118 is a digital camera that is fitted with an objective 138, such as a macro objective, and a filter which is able to transmit NIR light. One example of an acceptable camera is an XCD-SX900 digital monochrome camera publicly available from Sony. The camera may have a resolution of 1280×960 with square 4.65 um pixels. The objective used in the imaging and acquisition subsystem may be used to acquire a field of view of 13 mm at a nominal fixed working distance of 161.5 mm measured from the C-mount reference to the focal plane. To account for lens tolerances, each lens may be set up with a spacer (for example, between 12 and 14 mm). The spacer is selected to optimize the correct focus of the camera (e.g., within the ±2 mm focus adjustment range). One example of a lens used in an inspection system is the S5 LPJ 3038 by SILL Optics (Wendelstein, Germany). The filters should reduce, and preferably prevent, transmission of visible light, for example, visible light that may interfere with the imaging of the lens provided by the NIR illumination. One example of a filter used in the illustrated embodiment of the invention is a 3 mm thick Schott RG780 glass (publicly available from Phoenix Optical Glass, Ltd, Wales, U.K.).

The components of the inspection head 110 form a high quality image of the lens 136 in the plane of a charge coupled device (CCD) image sensor array, and transfer the image to the inspection platform for assessment by one or more algorithms, as discussed herein. The digital image data and control data may be communicated to a computer via any suitable communication protocol and computer connection, including Firewire connections. A bayonet fitting connector (BNC) may provide a communication signal for trigger input.

The various components of the inspection head 110 are attached to a frame 120 structured to work with a demolding machine. The components may be attached to the frame by any conventional means such as fastening means, including screws, pins, or rivets, or by pressure fit engagements. The components, including the cameras are provided on adjustable mounts, such as vertically adjustable mounts, that provide positional correction and alignment for initial adjustment and focus.

Figure 7:
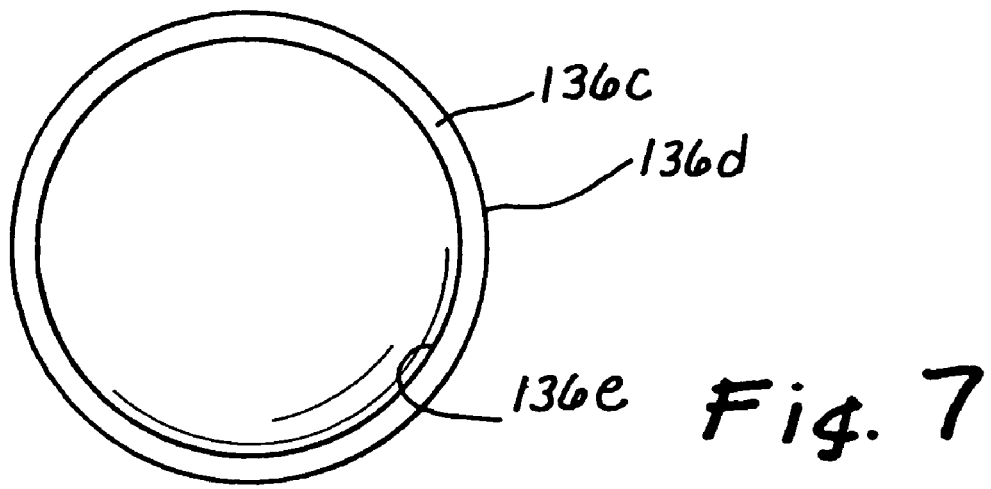
FIG. 7 is top plan view of an image of a complete edge of an ophthalmic lens.
Figure 8:
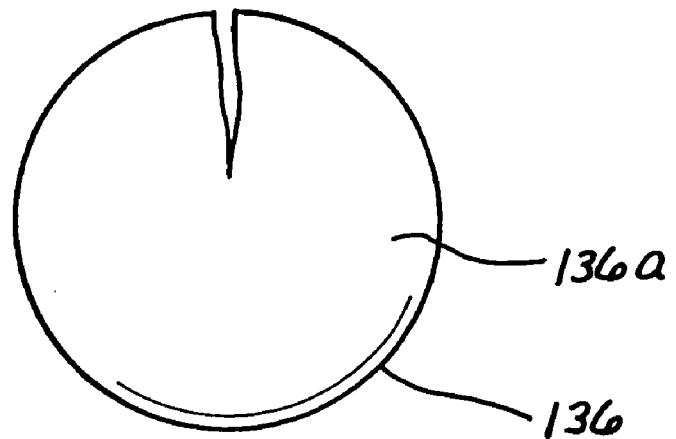
FIG. 8 is a top plan view of an image of a surface of an ophthalmic lens having a tear in the lens.

As discussed herein, the determination of whether a camera is inspecting a lens edge or a lens surface depends on the focal point of the camera (i.e., the edge imaging is obtained by acquiring an image of the lens focused at, or near, the level of the inspection window (see FIG. 7, for example), and the surface image is obtained by acquiring an image of the lens slightly above the inspection window, or spaced apart from the lens edge (see FIG. 8, for example)). In other words, the cameras are positioned at a predetermined distance from the lens surface or lens edge to obtain one complete, focused image of the lens edge, and one complete, focused image of the lens surface. In this context, the term "complete" refers to an image of a lens that is not divided into portions. For example, a complete focused image of the lens will be substantially circular (FIGS. 7 and 8). In the case of a complete edge image, the shape will be annular, or in other words, the image will have a ring shape that is in focus (FIG. 7), and will have a central portion that is out of focus. In the case of the surface image, the image will have a center portion (FIG. 8). Because the cameras are fixed in place, the particular type of image acquired by a particular camera may be determined by the vertical positioning of the mounting plate or rotating table with respect to the objective lenses of the cameras.

Figure 5:
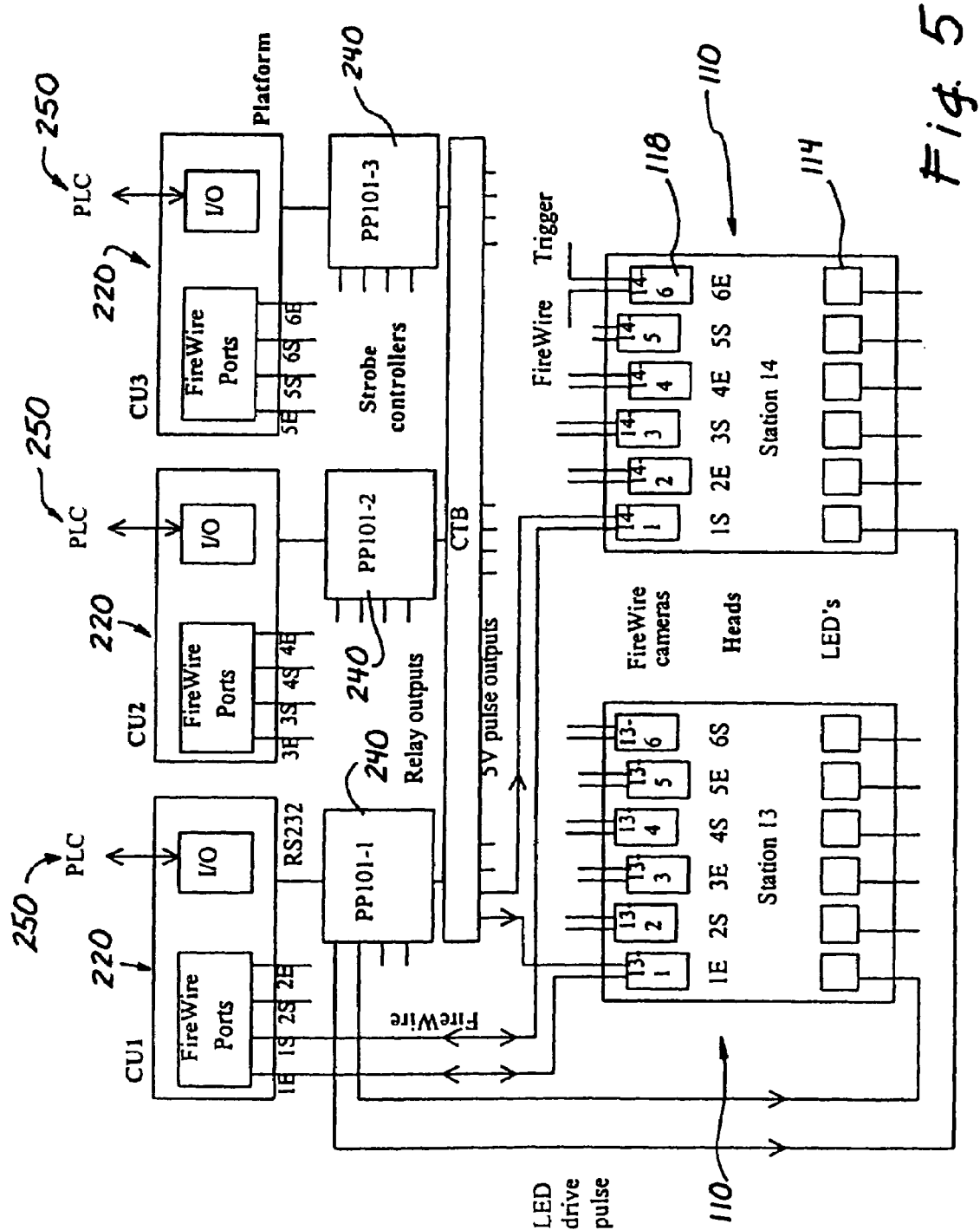
FIG. 5 illustrates the wiring of the inspection heads and camera units of the lens inspection system of FIG. 1.

In the illustrated embodiment of the invention, and as shown in FIG. 5, the cameras 118 are staggered so that an individual camera either is focused on the lens edge or the lens surface. For example, inspection heads 110 comprise two stations 13 and 14. Each station comprises six cameras (13-1, 13-2, . . . , 13-6; and 14-1, . . . , 14-6). Camera 13-1 is positioned to focus on the edge of lens 1 (1E; E indicates edge), and camera 14-1 is positioned to focus on the surface of lens 1 (1S; S indicates surface). Similarly, camera 13-2 is positioned to focus on the surface of lens 2 (2S), and camera 14-2 is positioned to focus on the edge of lens 2 (2E). Accordingly, a set of six ophthalmic lenses may be passed on a table through station 13 where three of the lenses are imaged in edge view, and three of the lenses are imaged in surface view. The six ophthalmic lenses may then be passed to station 14, where the lenses that have had their edges imaged may have their surfaces imaged, and where the lenses that have had their surfaces imaged, have their edges imaged. Thus, in one complete cycle, each ophthalmic lens has had two complete images taken, which are then inspected for defects. Although the disclosure herein relates to an inspection system that utilizes two individual cameras to acquire a complete edge image and a complete surface image of a lens, other embodiments of the invention could employ a single camera that takes two images at two different focal planes, or the images could be acquired using two cameras in one inspection head given that it may be desirable to adjust the rotating or incrementing of the table supporting the lenses. Providing two separate cameras for two separate views has the advantages of robustness and stability, among other things. In even further embodiments of the invention, additional cameras may be provided to acquire additional views of the lenses.

Thus, in the illustrated embodiment of the invention, the inspection heads 110 of the image acquisition subsystem 100 are responsible for acquisition of electronic images of the lenses passing through the demolder. Each inspection head 110 is capable of inspecting all six lenses at its station within one machine index period (e.g., about 2 seconds). The two inspection heads provide the capacity to acquire two images of every lens passing through the six track capacity of the demolder.

The two inspection heads are structured to create two distinct views of different portions, such as an edge view and a surface view, of each lens. The two views will correspond to an image of a single lens. In edge view, the plane of focus coincides, or nearly coincides, with the edge of the lens so that edge defects or abnormalities are detectable. The image obtained of the edge of the lens is an image of the entire lens edge. Or, in other words, the image is a single, complete image of the lens edge, which is in contrast to some existing systems that obtain a plurality of separate images of the edge of lenses. In addition, any debris on the inspection window that is not on the lens may be detected. Separately imaging the edge of the lens with a single camera improves over conventional inspection systems because the edge may be imaged at a finer resolution than previous systems that only acquired a single image of both the lens surface and lens edge. The finer resolution provides increased sensitivity to detect defects or abnormalities in the lens edge. The large depth of field systems may not be able to differentiate between debris on the inspection window and lens edge defects, thereby contributing to an increased rate of rejection of acceptable lenses.

In the illustrated embodiment, the lens is inspected with its edge down on a window, such as a sapphire window. In surface view, the plane of focus of the camera is raised to intersect the lens above its edge so that surface defects are detectable. The surface view of the lens provides a single, complete view of the lens surface. In one embodiment, the distance between the lens of the camera and the ophthalmic lens is set so that the entire surface of the lens (e.g., the portion of the lens that is spaced apart from the lens edge) forms a single image. In other embodiments, the plane of focus may be more restricted to examine portions of the lens surface, such as the optic zone, or the peripheral zone (i.e., the zone between the optic zone and the lens edge). The depth of focus may also be restricted such that any debris that collects on the inspection window does not appear in sharp focus in surface view. This approach (i.e., obtaining a surface and edge view of the lens) overcomes the high false rejection rate that is present in inspection systems that utilize a single high depth of field view in acquiring the lens images. The demolder of the inspection system described herein may also include a cleaning station in the event that an uncontrollable amount of debris accumulates. In addition, the inspection system may include a device to deliver ionized air to the lens to help reduce the likelihood of contaminants on the lenses.

2. Image Analysis Subsystem 200.

Figure 6:
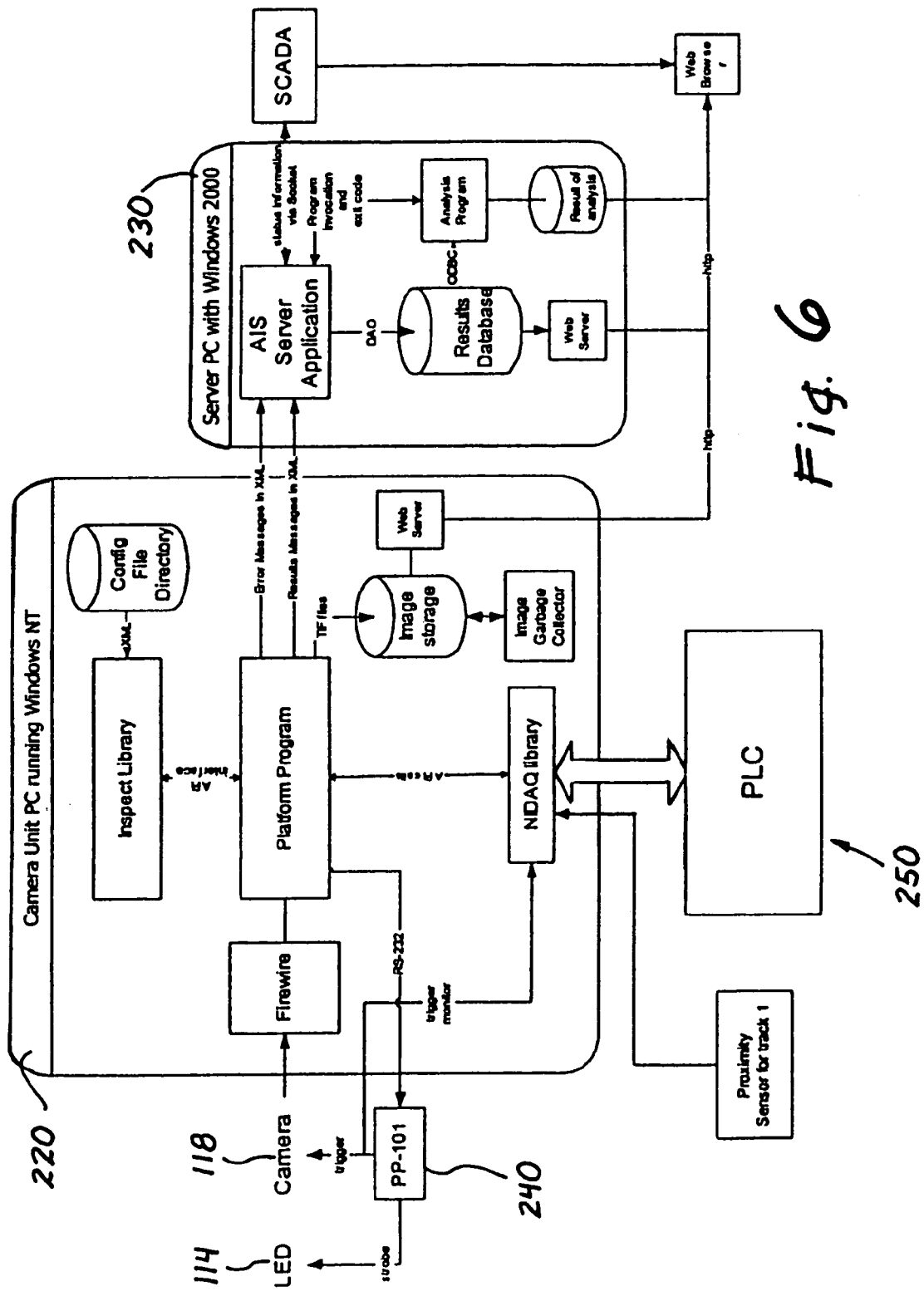
FIG. 6 illustrates hardware and software components of a lens inspection system.

Image analysis subsystem 200, or inspection platform, comprises one or more computers 210 that are in communication with image acquisition subsystem 100 so that the computers can receive and analyze lens image data captured by the cameras 118 (see FIGS. 5-7).

In more detail, inspection platform 200 comprises one or more camera units 220; and one or more automatic inspection system servers 230. Additional computer components may be provided to permit data entry, such as a keyboard or mouse, data display, such as a monitor, network switches, modems, and power supplies. The elements of the inspection platform 200 may be provided in one or more cabinets. The elements of the inspection platform 200 may be wired together as illustrated in FIG. 5.

In the illustrated embodiment of the invention, inspection platform 200 comprises three camera units 220. Each camera unit 220 is a computer to run camera unit software. Each camera unit is responsible for analyzing two of the six tracks of lenses (e.g. lenses in track 1 and 2, as shown in FIG. 5). Each camera unit 220 may include one or more communication cards, such as Firewire cards, which are structured to receive image data from, and to control settings of, the cameras 118. One example of a suitable Firewire card is the publicly available Unibrain FireBoard400 (The 1394 Store, San Ramon, Calif., U.S.). The computers 220 may also include a digital input/output (I/O) card that is connected to the demolding machine programmable logic controller 250 through the opto-isolators 222 for digital communications. One example of a suitable I/O card is the PCI-6503 from National Instruments (Newbury, Berkshire, U.K.).

The automatic inspection system (AIS) server 230 of the inspection system 10 is responsible for running the AIS Server software. The AIS Server is networked to the supervisory control and data application (SCADA) for process supervision.

The lighting controller 240 of the inspection platform 200 provides programmable control of camera triggers and LED strobes. The control may be provided via an RS232 interface. In the illustrated embodiment of the invention, each camera unit 220 will control a lighting controller 240 and use four of the lighting controller's LED outputs to flash the illumination LEDs 128 of integrating spheres 114 with a defined current and duration, and the switch outputs to trigger the four attached cameras (via a camera trigger board (CTB). One example of a suitable lighting controller is the PP101 Lighting Controller available from Gardasoft Vision (Ben Drayton, U.K.). A camera trigger board may be any suitable board that permits the lighting controller to send a voltage signal (such as a 5 Volt trigger signal) to the cameras. The automatic inspection system is wired such that when the camera trigger board is triggered, one of the camera unit's opto-isolators is also triggered so that the camera unit can determine or detect that the lighting controller trigger has occurred.

The opto-isolators are used to isolate the trigger signals of the computer from the voltage signals of the programmable logic controller. A suitable example of an opto-isolator is Grayhill 70RCK24 (Norvell Electronics, Inc., Irvine, Calif., U.S.) with Crydom input/output modules (6321 & 6101A, which are DC output and DC input modules, respectively).

The position sensor may be wired into the inspection platform 200. The position sensor may be a Wenglor LD86PCV3. In the illustrated embodiment, the sensor is set to be normally open by rotating a potentiometer nearest the red lens of the sensor so that it is fully clockwise. The lower potentiometer adjusts the sensitivity and is typically set up during installation. The position sensor serves to indicate the radial position of the ophthalmic lens support table.

3. Lens Inspection.

An automatic inspection system provides a single inspection point in the ophthalmic lens manufacturing process. A dry, or otherwise non-hydrated, lens is inspected in a single state after the lens has been demolded. Inspecting the lens in a single state, such as the dry state, is advantageous in automated systems because the number of steps to inspect the lenses is reduced. The automatic inspection system acquires a complete image of the lens edge, and acquires a complete image of a lens surface spaced apart from the lens edge. Each of the images alone, and/or together are inspected. If both of the inspections do not yield detectable defects, the lenses are accepted and passed to the next stage of processing. The process can be repeated for each lens, if desired, to improve the reliability of the inspection. As will be understood from the disclosure herein, any additional processing of the lenses should be performed so that the lenses are not damaged or otherwise contaminated after being passed by the inspection system.

As one example, an inspection cycle performed using lens inspection system 10 may include rotating a table 132 of the demolding machine to place a demolded ophthalmic lens under each of the cameras used in the image acquisition subsystem 100. The ophthalmic lenses may be centered on the demolding machine table so that when the table rotates, the lenses will be in the light path emanating from the light source to the camera. The demolder machine generates a signal to trigger the image acquisition subsystem 100 to acquire an image of the lens. The image acquisition subsystem will acquire an image of the lens edge, and an image of the lens surface. The images of the lenses may be analyzed using one or more computer algorithms to determine whether the inspected lens passes or fails the standards required by the system. The analysis results may then be passed to the demolder machine to decide if the overall lens has passed or failed inspection. The demolding machine may reject defective lenses before transferring the acceptable lenses to the next station for packaging or further processing. The image analysis subsystem may also generate detailed reports regarding the inspection procedures and results.

When the lens edge images are acquired, the camera is substantially focused on the window on which the lens is placed. When the lens surface images are acquired, the camera is focused above the surface of the inspection window (e.g., spaced apart from the lens edge). As an example, when the lens being inspected is approximately 4 mm high (e.g., the perpendicular distance from the window to the center of the lens is approximately 4 mm), the camera may be focused about 2 mm from the inspection window.

As discussed hereinabove, each camera unit 220 is a computer. The computers 220, through software, provide for image capture, analysis and classification of the lens images using one or more lens inspection algorithms. The software may also provide communication with the other computers or components of the automatic inspection system, and may provide automated control of the illumination of the lens being inspected.

The analysis and classification of both the edge and surface images takes place over two indices of the demolder. Accordingly, the "AND" function is implemented to determine whether a lens ultimately passes or fails inspection (e.g., the edge inspection passes AND the surface inspection passes) may not be carried out by the camera unit, but instead may be determined by the programmable logic controller 250. One example of the controller is a SLC 5/05, manufactured by Rockwell Automation (Milwaukee, Wis.).

The data regarding the images obtained by camera units 220 may then be communicated to the image server 230, which stores the data results regarding the images, collates the inspection data, communicates with the SCADA system, analyzes the image data to assist in process optimization and understanding, and communicates with one or more remote computers.

An overview of the automatic inspection system is illustrated in FIG. 6. For purposes of illustration, the figure only shows the configuration of one of the camera units 220. As indicated hereinabove, each camera unit 220 is responsible for acquiring at least one surface image and at least one edge image of the lenses being inspected. These images are analyzed, and pass/fail decisions are rendered for each view. Accordingly, each camera unit reports a plurality of pass/fail decisions to the programmable logic controller 250, and more detailed results to the SCADA via automatic inspection server 230.

The platform software of camera unit 220 is the central module for the inspection system. The platform software coordinates the capture of images of the lenses being inspected, the processing of the images, and the communication of the results to the various other components of the inspection system. The platform software may provide operation information about its state, and may display or report any error messages. The information provided by platform software may be displayed on the monitor of the system, and/or may be relayed to server 230.

The inspect library of the camera unit contains the image processing algorithms. The inspect library may be passed an image of a lens. The library checks whether the imaged lens is faulty or has characteristics, such as physical or optical characteristics that are not desirable, and it returns a pass/fail decision on the lens together with more detailed information about the reasons for the pass/fail. Different configurations of the algorithms may be used depending whether the lens image is an edge image or a surface image.

Camera unit 220 also includes an inspection library configuration file(s) which define key configuration parameters for the inspect library. Examples of parameters include, but are not limited to, thresholds for various inspection tests within the algorithm, and therefore define the overall criteria of the inspect library for passing or failing a lens. The files may be stored in extendible markup language format (XML format).

Other libraries, such as a NIDAQ library and a Firewire library, may be provided with camera unit 220. These libraries may be used to drive the various other components of the inspection system, and to communicate with those components.

The camera unit may also include one or more programs to store the image data, including the digitized images, and to automatically and periodically remove unwanted or unused data files.

The automatic inspection system server application of the automatic inspection system server 230 provides an interface between the SCADA and the camera units. For example, commands issued at the SCADA can be passed to the camera units for execution, and reports generated by the camera units can be passed to the SCADA.

The web server component of the automatic inspection system server provides an interface that allows an operator to see the inspection results as they are reported by the camera units. The user may have the ability to examine diagnostic results, lot results, and recent images, as well as display the AIS system's event log.

The automatic inspection server results database contains tables to hold an event log of status messages received from the camera units; a set of detailed results, which may be indexed by lot and by demolder track index; results of running the diagnostic mode; and a summary of recent lot results. The database may also maintain a set of stored procedures, which allow summaries of lens categories for the current lot to be produced, and allow results associated with a particular lot to be removed from the database.

The edge inspection algorithms of the inspect library of camera unit 220 process the edge images of the lens being inspected. The edge algorithm is responsible for detecting lens edge defects, misshapen lenses, and missing lenses. The algorithms will be able to detect if no lens is present on the inspection window; detect whether the lens image is under illuminated, over illuminated, out of focus, and not centered; detect lenses with too small or too large diameters; detect lenses that are too non-circular; and detect edge defects that are indicated by a significant deviation in the lens edge contour from a perfect ellipse, or a significant change in the image intensity along the lens edge. The edge inspection algorithms can also be used to measure the lens edge thickness to determine whether the lens has the desired edge thickness, such as a constant edge thickness, among other things, and/or determine whether the lens edge has a desired structural shape, such as a bevel shape, for example on the low edge apex.

The surface inspection algorithms of the inspect library of camera unit 220 are responsible for detecting defects on the lens surface, or foreign bodies on the lens surface. Coarse or gross edge defects may also be detected in a similar way as the edge defect detection algorithm. However, the sensitivity to edge defects is lower than the dedicated edge defect detection algorithm, as discussed above. The surface inspection algorithms should be able to detect if no lens is present; detect lens images that are under illuminated; over illuminated; out of focus, and/or not centered; detect lenses having too small or too large diameters; detect lenses that are too non-circular; detect edge defects that are indicated by a significant deviation in the lens edge contour from a perfect ellipse, or a significant change in the image intensity along the lens edge. The edge defect detection techniques provided in the surface inspection algorithms may understandably be less sensitive than that used in the edge defect detection algorithm. The surface defect detection algorithm may also detect defects on the surface of the lens as indicated by changes in contrast in the lens image compared with the local background level. As discussed herein, the surface defect detection algorithm may be used to inspect the entire lens surface, or portions of the lens surface. For example, the surface defect detection algorithm may be used to inspect the optic zone of the lens, the peripheral zone of the lens, or a combination of the optic zone and peripheral zone. Typically, the surface defect detection algorithm inspects the center of the lens as opposed to the lens edge, at least at high resolutions. The algorithm may also be able to classify defects into categories such as particle, scratch, blemish, bubble, fiber, and unknown. The algorithm may be able to apply lens rejection criteria particular to the type of defect detected. For example, the criteria may be based on the area, length, contrast, and position (radius) of the detected defects. In addition, the algorithm may be able to output that information that caused the lens to be rejected.

The inspect library configuration files may contain the rules that are applied to the inspection algorithm. The rules can thus be passed as parameters to the software for execution of the program. Accordingly, an operator of the inspection system can alter the rules without modifying or recompiling the software calling these parameters.

The particular algorithms and software programs used in accordance with the present invention may be practiced using any conventional programming language and rules, as understood in the art. In an embodiment of the invention actually reduced to practice, the inspection algorithms are programmed in C or C++. Although the specific parameters and algorithms used may vary without departing from the spirit of the invention, some parameters may include, and are not limited to, the area of the image to enclose the lens, criteria for tracking a lens edge, criteria for rejecting missing lenses, criteria for rejecting bad lens images, criteria for rejecting misshapen or misaligned images, and criteria for rejecting lens edge defects.

The area of the image to enclose the lens may be selected to allow processing of a smaller proportion of the camera CCD array, which helps reduce computation and improve processing speed. The edge tracking criteria is used to identify and track potential lens edges. The criteria include the minimum contrast level for detecting a candidate pel on the lens edge, and the minimum contrast for tracking a candidate lens edge. The criteria may also include parameters to distinguish the perimeter of the lens and the perimeter of another object, such as a feature on the lens. The criteria may also include a parameter to define a distance, or gap, between the inner and outer tracks (e.g., inner and outer edges) of the lens edge. Criteria for inspection may also include parameters to determine if the lens is missing, such as a minimum perimeter, or radius. Parameters to determine the limits on lighting and focus on the lens images may include minimum and maximum intensity values (e.g., mean pixel intensity within a given area of the image), and minimum edge contrast values to facilitate detection of inadequate focus. Criteria may also be provided that address the maximum permitted deviation of a lens ellipse from a circular shape. Criteria also include the minimum amplitude and minimum length of defects. The defects typically manifest themselves as changes in illumination of the CCD pixel array, and thus, setting specific threshold values permits the algorithm to determine whether the lens image of a particular lens exceeds these thresholds.

The detection and tracking algorithms make use of pixel intensity and contrast levels between defects and the neighboring background area. Different detection and tracking thresholds can be defined depending on the sensitivity needed for lens inspection. For example, higher thresholds may be provided in areas of the lens with high curvature, where contrast levels may change more rapidly. Higher thresholds are generally used for defect detection than for tracking. The particular threshold values used for the inspection algorithms can be determined empirically, and optimized to achieve desired lens passage and failure rates.

Using the edge inspection algorithms, it is possible to track the lens edge based on differences in contrast between the lens edge and the background. By providing an algorithm with user defined parameters, such as contrast thresholds, the inspection system provides accurate inspection of lenses with reduced differences in contrast. In other words, the inspection system is more sensitive than conventional systems requiring high contrast images. The edge tracking algorithm also provides for accurate tracking of the lens edge. Other systems are subject to jumping as the edge is being tracked, for example, other systems may undesirably and periodically track the outer edge of the lens edge, and then "jump" to the inner edge of the lens edge. The changes in tracking may be perceived as defects in the lens. In contrast, the software of the present invention includes a parameter that reduces the likelihood that the tracking of the lens edge will be compromised by such jumping.

The software provided with the inspection system may also include one or more programs for diagnostic functions. For example, the inspection system may be able to inspect the lens inspection windows for damage prior to them being loaded with lenses, and may be able to monitor defects that have been logged for periodic errors. Periodic errors may be indicative of errors in the demolding process or at some other point in the inspection or manufacturing process.

The inspection system disclosed herein thus has the advantages of improved resolution of scanning an ophthalmic lens edge, thereby reducing false rejection rates and reducing rates of passing defective lens, improved defect detection by inspecting lenses for defects in two or more images, and the ability to provide increased diagnostics regarding lens defects based on the inspection results.

While this invention has been described with respect to various specific examples and embodiments, it is to be understood that the invention is not limited thereto and other embodiments are within the scope of the invention.

A number of patents and other documents have been identified herein. Each of the patents and documents identified herein are hereby incorporated by reference in their entireties.

What is claimed is:

1. An automated ophthalmic lens inspection system, comprising:
   (a) an image acquisition system including first and second digital cameras, the first and second digital cameras each having an optical path, and an ophthalmic lens support having a planar lens supporting surface providing the only contact surface for an ophthalmic lens, the image acquisition system being structured to position the ophthalmic lens placed on the planar lens supporting surface of the ophthalmic lens support to allow the first camera and the second camera to focus on the ophthalmic lens at different times, the first camera being positioned at a distance from the ophthalmic lens so that a lens of the first camera is focused on an edge of the ophthalmic lens to obtain a single image of the entire edge of the ophthalmic lens and being positioned so that the optical path of the first camera is parallel to an optical axis of the ophthalmic lens located on the ophthalmic lens support, and the second camera being positioned at a distance from the ophthalmic lens so that a lens of the second camera is focused on a surface of the ophthalmic lens spaced apart from the ophthalmic lens edge to obtain a single image of the surface of the ophthalmic lens spaced apart from the ophthalmic lens edge and being positioned so that the optical path of the second camera is parallel to the optical axis of the ophthalmic lens located on the ophthalmic lens support; and
   (b) an image analysis system including at least one computer having one or more programs to inspect the images of the edge of the ophthalmic lens and the surface of the ophthalmic lens spaced apart from the ophthalmic lens edge obtained by the first and second cameras, respectively.

2. The system of claim 1, wherein the first and second cameras are each positioned to focus on a portion of the lens to obtain a clearer image of the lens edge or the lens surface spaced apart from the ophthalmic lens edge relative to the clarity of an image obtained with only a single camera positioned at a single focal plane.

3. The system of claim 1, wherein the first and second cameras are configured to receive near-infrared light passed through the ophthalmic lens.

4. The system of claim 1, wherein the at least one computer is in communication with the first and second cameras to receive the images obtained with the cameras.

5. The system of claim 1, wherein the at least one computer includes an edge tracking program configured to track an outer edge and an inner edge of the ophthalmic lens edge by examining changes in contrast between the edges of the ophthalmic lens and a background adjacent to the ophthalmic lens edges.

6. The system of claim 1, wherein the at least one computer includes at least one program configured to categorize defects detected in the images of the edge of the ophthalmic lens and the surface of the ophthalmic lens spaced apart from the ophthalmic lens edge.

7. The system of claim 1, wherein the images inspected by the at least one computer are an image of an edge of a contact lens and an image of a surface of a contact lens spaced apart from the contact lens edge.

8. An automated ophthalmic lens inspection system, comprising:
   (a) an image acquisition system including
      (i) a light source,
      (ii) an ophthalmic lens support having a planar lens supporting surface providing the only contact surface for an ophthalmic lens and structured to hold an ophthalmic lens at a predetermined distance from the light source and to pass light from the light source, and
      (iii) a camera having an objective lens positioned to receive light provided by the light source and passed through the ophthalmic lens support along an optical path that is parallel to an optical axis of the ophthalmic lens, the objective lens of the camera positioned a predetermined distance from the ophthalmic lens located on the ophthalmic lens support so that the camera focuses on an edge of the ophthalmic lens or on a convex surface of the ophthalmic lens located away from the edge of the ophthalmic lens, provided that the camera does not focus on both the edge of the ophthalmic lens and the convex surface of the ophthalmic lens located away from the edge of the ophthalmic lens at the same time, to obtain a single digital image of the entire edge of the ophthalmic lens or the entire convex surface of the ophthalmic lens located away from the edge of the ophthalmic lens; and
   (b) an image analysis system including at least one computer in communication with the camera of the image acquisition system to receive a digital image of the ophthalmic lens, the computer including instructions to analyze the digital image of the ophthalmic lens.

9. The system of claim 8, wherein the light source is structured to provide light at approximately 880 nm.

10. The system of claim 8, wherein the light source includes a light emitting diode located in a housing structured to provide spatially uniform illumination of the ophthalmic lens.

11. The system of claim 8, wherein the ophthalmic lens support includes a planar surface configured to support the ophthalmic lens in a non-hydrated state.

12. The system of claim 11, wherein the ophthalmic lens is a contact lens having a convex anterior surface and a concave posterior surface, and the ophthalmic lens support is configured to hold the contact lens so that the convex anterior surface is located closer to the objective lens of the camera than the concave posterior surface.

13. The system of claim 8, wherein the ophthalmic lens support is a rotating support that moves the ophthalmic lens into and out of alignment with the light source and the camera.

14. The system of claim 8, wherein the camera includes a filter to reduce transmission of light other than near-infrared light.

15. The system of claim 8, comprising a plurality of light sources and cameras positioned to acquire images of complete lens edges and of lens surfaces located away from the edge of the ophthalmic lens of a plurality of ophthalmic lenses.

16. The system of claim 15, comprising a first set of cameras and a second set of cameras, the first set of cameras being positioned so that the objective lenses of the cameras are focused on the edges of the ophthalmic lenses being inspected, and the second set of cameras being positioned so that the objective lenses of the cameras are focused on the surfaces located away from the edge of the ophthalmic lens being inspected.

17. A method for automatically inspecting ophthalmic lenses, comprising
- (a) providing an ophthalmic lens on an ophthalmic lens support so that an edge of the ophthalmic lens is the only region of the lens contacting the ophthalmic lens support, and the ophthalmic lens is located in a light path between a light source and a first camera having an objective lens focused on a portion of the ophthalmic lens, the light path being parallel to an optical axis of the ophthalmic lens, the portion being either an entire edge of the ophthalmic lens or an entire surface of the ophthalmic lens that is spaced apart from the edge of the lens, but not being focused on both the edge and the surface of the ophthalmic lens;
- (b) obtaining a digital image of the portion of the ophthalmic lens that is in focus;
- (c) positioning the ophthalmic lens under a second camera having an optical path oriented parallel to the optical axis of the ophthalmic lens on the ophthalmic lens support so that the portion of the ophthalmic lens that was out of focus in step (a) is in focus;
- (d) obtaining a digital image of the portion of the ophthalmic lens that is in focus in step (c); and
- (e) inspecting the digital images of the ophthalmic lens for defects.

18. The method of claim 17, wherein the ophthalmic lens is a contact lens having a convex anterior surface and a concave posterior surface, and the contact lens is located on the ophthalmic lens support so that the convex anterior surface is closer to the objective of the camera than the concave posterior surface.

19. The method of claim 17, wherein the positioning step comprises moving the ophthalmic lens support so that the ophthalmic lens is positioned under a second camera having an objective lens focused on the portion of the lens that was out of focus in step (a).

20. The method of claim 17, wherein step (c) comprises moving the camera used in step (b) so that the objective lens of the camera is focused on the portion of the ophthalmic lens that was out of focus in step (a).

21. The method of claim 17, wherein the digital images comprise pixels, and step (e) comprises tracking the edge of the digital images of the lens by measuring the intensity of the pixels around the edge of the digital image.

22. The method of claim 21, wherein step (e) includes tracking an outer edge and an inner edge of the ophthalmic lens edge.

23. The method of claim 21, wherein step (e) includes detecting changes in contrast between, a pixel representing the edge of the lens and adjacent pixels, where a change in contrast that exceeds a predetermined threshold is categorized as a detect.

24. The method of claim 21, further comprising (f) categorizing detects detected in step (e).

25. The method of claim 21, wherein the step (b) comprises receiving near-infrared light that is emitted from a light source and transmitted through the ophthalmic lens.

26. A method for automatically inspecting ophthalmic lenses, comprising
- (a) obtaining a complete image of an edge of an ophthalmic lens with a camera focused on the edge of the ophthalmic lens and having an optical path oriented parallel to an optical axis of the ophthalmic lens, the edge of the lens being the only contact region between the lens and a lens support structure on which the lens is placed;
- (b) obtaining an image of a convex surface of the ophthalmic lens with a camera focused away from the edge of the ophthalmic lens and having an optical path oriented parallel to the optical axis of the ophthalmic lens; and
- (c) transferring the images of steps (a) and (b) to at least one computer for analysis of the images.

27. The method of claim 26, wherein the ophthalmic lens is a contact lens, and wherein the images of the contact lens are of the contact lens in a non-hydrated state.

28. The method of claim 26, wherein the image of the edge of the ophthalmic lens has an inner edge and an outer edge, and further comprising tracking the inner edge and the outer edge with software provided with the at least one computer.

29. The method of claim 26, further comprising categorizing defects detected by the at least one computer.

* * * * *